United States Patent
Dermark et al.

(10) Patent No.: US 9,209,678 B2
(45) Date of Patent: Dec. 8, 2015

(54) POWER CONVERTER SYSTEM PROVIDING A LOAD WITH ELECTRICAL POWER

(75) Inventors: Daniel Dermark, Landvetter (SE); Lars Kanderhag, Göteborg (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 14/366,992

(22) PCT Filed: Feb. 2, 2012

(86) PCT No.: PCT/SE2012/050102
§ 371 (c)(1),
(2), (4) Date: Oct. 16, 2014

(87) PCT Pub. No.: WO2013/115688
PCT Pub. Date: Aug. 8, 2013

(65) Prior Publication Data
US 2015/0124501 A1    May 7, 2015

(51) Int. Cl.
| | |
|---|---|
| H02M 1/32 | (2007.01) |
| H02J 1/10 | (2006.01) |
| H02J 4/00 | (2006.01) |
| H02J 3/38 | (2006.01) |
| H02M 3/158 | (2006.01) |

(52) U.S. Cl.
CPC ........... *H02M 1/32* (2013.01); *H02J 1/102* (2013.01); *H02J 3/386* (2013.01); *H02J 4/00* (2013.01); *H02M 3/1584* (2013.01)

(58) Field of Classification Search
CPC ................. H02M 3/1584; H02J 1/102
USPC ............. 323/272; 363/65, 67, 69, 71
See application file for complete search history.

(56) References Cited

U.S. PATENT DOCUMENTS

| | | | |
|---|---|---|---|
| 6,285,572 B1* | 9/2001 | Onizuka et al. | 363/72 |
| 2008/0093933 A1* | 4/2008 | Pracht et al. | 307/116 |
| 2011/0254374 A1* | 10/2011 | Humphrey | H02M 1/32 307/80 |
| 2011/0254531 A1* | 10/2011 | Markowski | H02M 3/1584 323/371 |

FOREIGN PATENT DOCUMENTS

| | | |
|---|---|---|
| EP | 1047179 A1 | 10/2000 |
| WO | WO 2009/027520 A2 | 3/2009 |
| WO | WO 2010/108928 A1 | 9/2010 |

OTHER PUBLICATIONS

International Searching Authority, International Search Report and Written Opinion for International Application No. PCT/SE2012/050102, Oct. 10, 2012, 9 pages, Swedish Patent and Registration Office, Sweden.
International Preliminary Examining Authority, International Preliminary Report on Patentability for International Application No. PCT/SE2012/050102, Jan. 24, 2014, 10 pages, Swedish Patent and Registration Office, Sweden.

* cited by examiner

*Primary Examiner* — Jue Zhang
*Assistant Examiner* — Lakaisha Jackson
(74) *Attorney, Agent, or Firm* — Alston & Bird LLP

(57) ABSTRACT

A power converter system suitable to provide a load with electrical power, the system comprising; an input voltage terminal; an output voltage terminal; a first power converter unit; a second power converter unit; an input relay unit; an output relay unit; a control unit; wherein the control unit is configured to control the input relay unit and the output relay unit such that the first and second power converter units are engaged alternating at subsequent power ups of the voltage input terminal.

3 Claims, 3 Drawing Sheets

POWER CONVERTER SYSTEM PROVIDING A LOAD WITH ELECTRICAL POWER

CROSS REFERENCE TO RELATED APPLICATIONS

This application is a National Stage Application, filed under 35 U.S.C. §371, of International Application No. PCT/SE2012/050102, filed Feb. 2, 2012, the contents of which are hereby incorporated by reference in their entirety.

BACKGROUND

1. Related Field

The present invention relates to a device and a method for improved reliability of power supply systems comprising power converters.

2. Description of Related Art

The invention is applicable in power supply systems. The invention stems from the need to counteract falling MTBF figures due to increased number of components. The invention thus addresses the problem of how to create more reliable converted power.

BRIEF SUMMARY

A more reliable power system is created by providing two or more converters arranged in parallel to increase MTBF. Additionally is included one or more relay units, a control unit, and accompanying sensors to distribute number of startups evenly between the converters by connecting only one of them between input and output terminals at a time. In this way a nearly 100% increase in MTBF may be achieved, provided the MTBFs for the added relay, sensors, and control unit are large by comparison. In addition, automatic switching may be provided at the failure of one converter.

It is an object of the present invention to provide more reliable systems by providing more reliable power supply. The power solutions of today have the principal appearance as shown in FIG. 1. An input voltage, $V_{in}$, is converted in a power conversion unit 101 to an output voltage $V_{out}$. The output voltage $V_{out}$ then provides converted power to a load 120. Should a failure occur in the power conversion unit 101 this would result in the load 120 becoming powerless and would cease to operate. Such a system is sensitive to failures in the power conversion unit. This is the case irrespective of the power conversion unit is a DC/DC-, AC/DC-, DC/AC- or AC/AC unit. Since a high reliability measure is to be aimed at, a device, system or method to increase the mean time between failures, MTBF for the system including the load, is the object of the present invention.

A solution to the problem of how to increase mean time between failures, MTBF, for a functional system including the load is to introduce redundancy in the power solution. Now referring to FIG. 2, two power converter units 101, 102 are provided. They are arranged to divide the load 120 among them. They provide power to the load 120 such that if one of the converters fail, the other one would take over the supply of power. A drawback with such a solutions could be that both power conversion units 101, 102 suffers the same number of start and stops as the load 120, and each also logs the same operating time as the load 120. This entails that the power converter system 101, 102 will be subjected to double the number of start ups, and the probability of getting a failure in a component in either of the converters raises twofold.

An alternate solution may therefore be to provide one of the converters as a "master" and one as a "slave". The master converter supplies the load, and the slave converter only becomes activated when the master fails. Still however, there is a drawback that the slave may be inactive during long periods of time and certain components in power converters will function better if used regularly, e.g. electrolyte capacitors. Therefore, the proposed power conversion system according to the invention comprises an input voltage terminal, an output voltage terminal, a first power converter unit 101, a second power converter unit 102; an input relay unit 301, an output relay unit 302, and a control unit 315; wherein the control unit 315 is configured to control the input relay unit and the output relay unit such that the first and second power converter units are engaged alternating at subsequent power ups of the voltage input terminal. See FIG. 3.

Since the power up operation and to a certain degree also the power down operation are critical operations regarding the electronics because, this is the moments at which electronic components break. An advantage with the solution according the invention is that the number of power ups is reduced to half for each power conversion unit and the probability for each converter failing will also be reduced to half. In this way MTBF figures will increase and redundancy will be introduced into the system.

With the aid of the control unit also a converter that is broken can be disengaged by never engaging the faulty converter unit. Additionally, there is the advantage of not running converters in parallel, which may be a problem in certain cases.

The solution is simple and may find use also outside the field of power supplies.

Thus, according to a first aspect there is provided a power converter system suitable to provide a load with electrical power, the system comprising;
an input voltage terminal;
an output voltage terminal;
a first power converter unit;
a second power converter unit;
an input relay unit;
an output relay unit;
a control unit;
wherein the control unit is configured to control the input relay unit and the output relay unit such that the first and second power converter units are alternately engaged at subsequent power ups of the voltage input terminal;

The power converter system may further comprise a number of sensors capable of measuring the input and output voltages relating to each power converter unit, the sensors being connected to the control unit.

The power converter system wherein the control unit is configured to engage and disengage a power converter unit based on the readings of the sensors.

The power converter system wherein the control unit is configured to engage one power converter unit and disengage remaining power converter unit(s) at power up based on the output of a random number generator that generates a new number at each subsequent power up.

According to a second aspect there is provided a method for controlling which converter to engage in the power converter, the method comprising the following steps.
Deciding if input voltage is applied
Deciding which power converter that are in turn to be engaged
Checking if a first converter unit was OK last time, and if not checking if it is replaced;
Checking further converters accordingly;
Engaging an OK converter by setting the relay units properly;

Checking continuously the output voltage of the engaged converter;

Deciding if the engaged converter has failed based on the output voltage of the engaged converter;

Issuing an alarm if one of the converters are failing

BRIEF DESCRIPTION OF THE FIGURES

The invention will now be further explained with the aid of one or more embodiments of the invention in conjunction with the accompanying drawings of which.

DETAILED DESCRIPTION OF VARIOUS EMBODIMENTS

Figure 1:
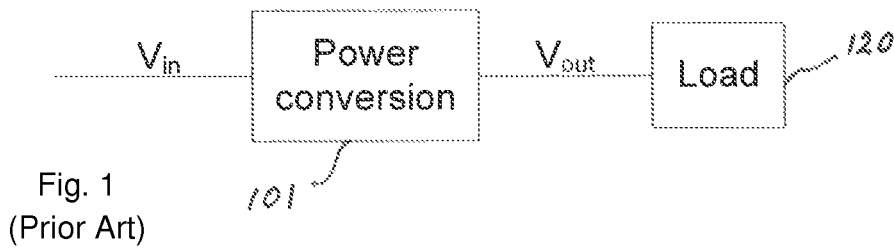
FIG. 1 shows a power supply solution according to prior art
Figure 2:
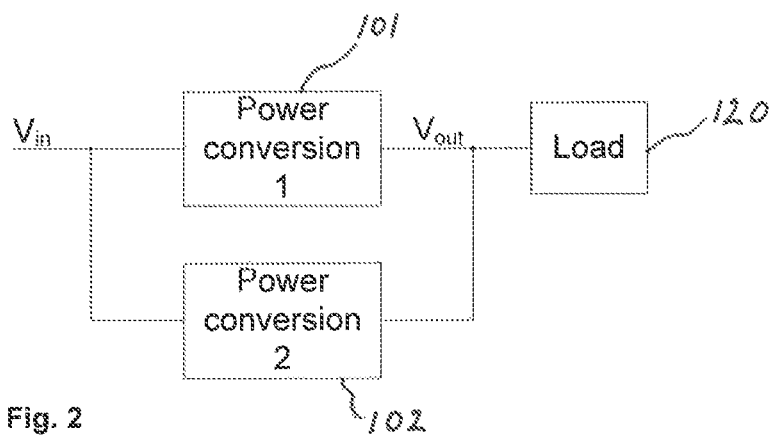
FIG. 2 shows a power supply solution with redundant power conversion units.
Figure 3:
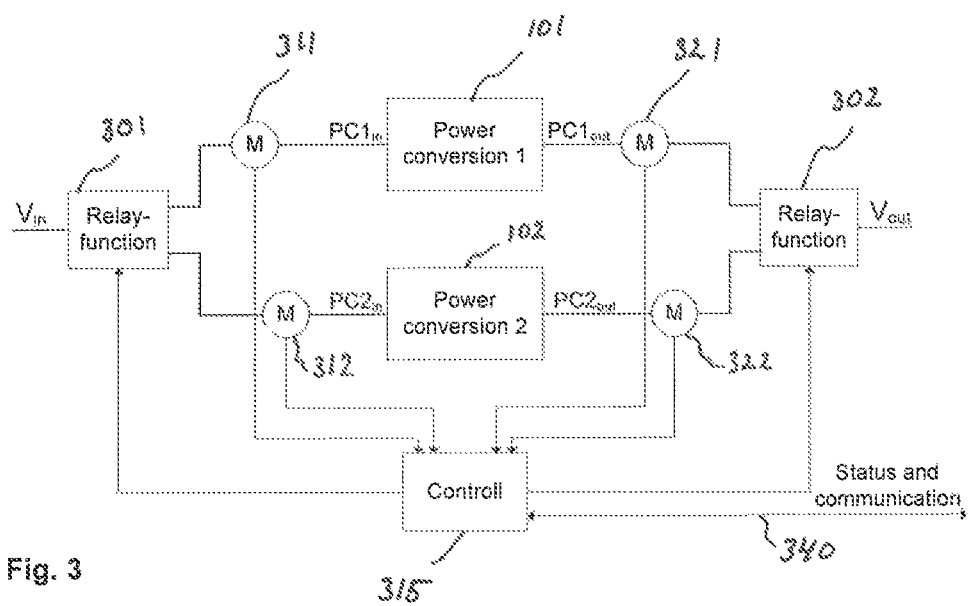
FIG. 3 shows a power supply solution with redundant power conversion units and also provided with relays and control means.

A solution to the above identified problems as devised by the inventors is to provide a relay arrangement 301, 302 comprising a first 301 and a second relay unit 302 to the power converter system of FIG. 2, resulting in the power converter system of FIG. 3. The relay units being provided with connections to a control unit 315, which control unit has been configured to control the relay units 301, 302 in order to engage the first power conversion unit 101 or the second power conversion unit 102 based on certain rules and/or inputs to the control unit 315. More about this will follow below.

The control unit 315 may preferably be configured to alternate start-ups between the two power converters. This could be predetermined to be every second time, every third time, every fourth time etc. The control unit may as an alternative be configured to randomly distribute the start-ups between the power converters, with a 50% probability over time for engaging each of them. This may be achieved by providing a random number generator and a rule by which a random number generated by the random number generator is converted to a power converter number. Alternate probabilities may be contemplated. The solution as described herein shall not be interpreted as confined to two converters also a solution with three or more converters may be contemplated to increase MTBF further. The probability figures for each converter being used then may be arranged to be 1/N, where N is the number of converters.

Measuring sensors M 311, 312, 321, 322, may be arranged to measure the voltage, and also possibly the current of the input and output of each converter, see FIG. 3, to be able to decide if any of the converter units are failing.

The control unit 315 is configured to disengage a broken, or breaking, converter. If any of the converters 101, 102 fail, the control unit 315 is configured to disengage that converter and let the fully functioning converter handle all start-ups. Preferably, the control unit is configured to issue an alarm signal, e.g. via a status and communication connection 340.

FIG. 3 thus shows a power supply system with two redundant power conversion units which is also provided with relays and control means to appropriately switch between them. The same principle rule also when more than two converter units are used. When a voltage is applied at input terminal $V_{in}$, the system powers up, i.e. starts.

Figure 4A:
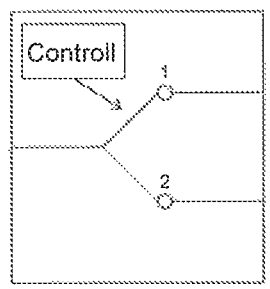
FIG. 4a, 4b, 4c shows three detail examples of the relay unit of FIG. 3.
Figure 4B:
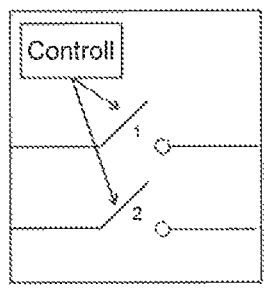
Figure 4C:
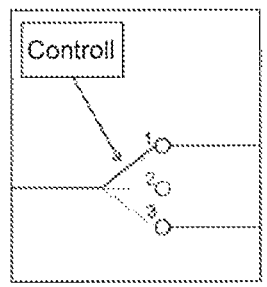

FIG. 4a, 4b, 4c shows in total three detail examples of the relay unit of FIG. 3. In FIG. 4a an alternating relay is shown. In FIG. 4b is shown a solution where each connection can be individually controlled. FIG. 4c shows a relay wherein connection is alternating between two positions at start-up, but having a third state wherein both converters are disconnected.

How to Decide Active Converter Unit

Internally, the control unit 315 may be provided with a counter that keeps track of which converter to start up next time. Depending on the number of power converter units to be used, the counter provides information to alternate between them. When there are two converters this may be implemented by letting a binary digit change between 0 and 1, where the numbers refers to one specific converter of the two.

A Method

Figure 5:
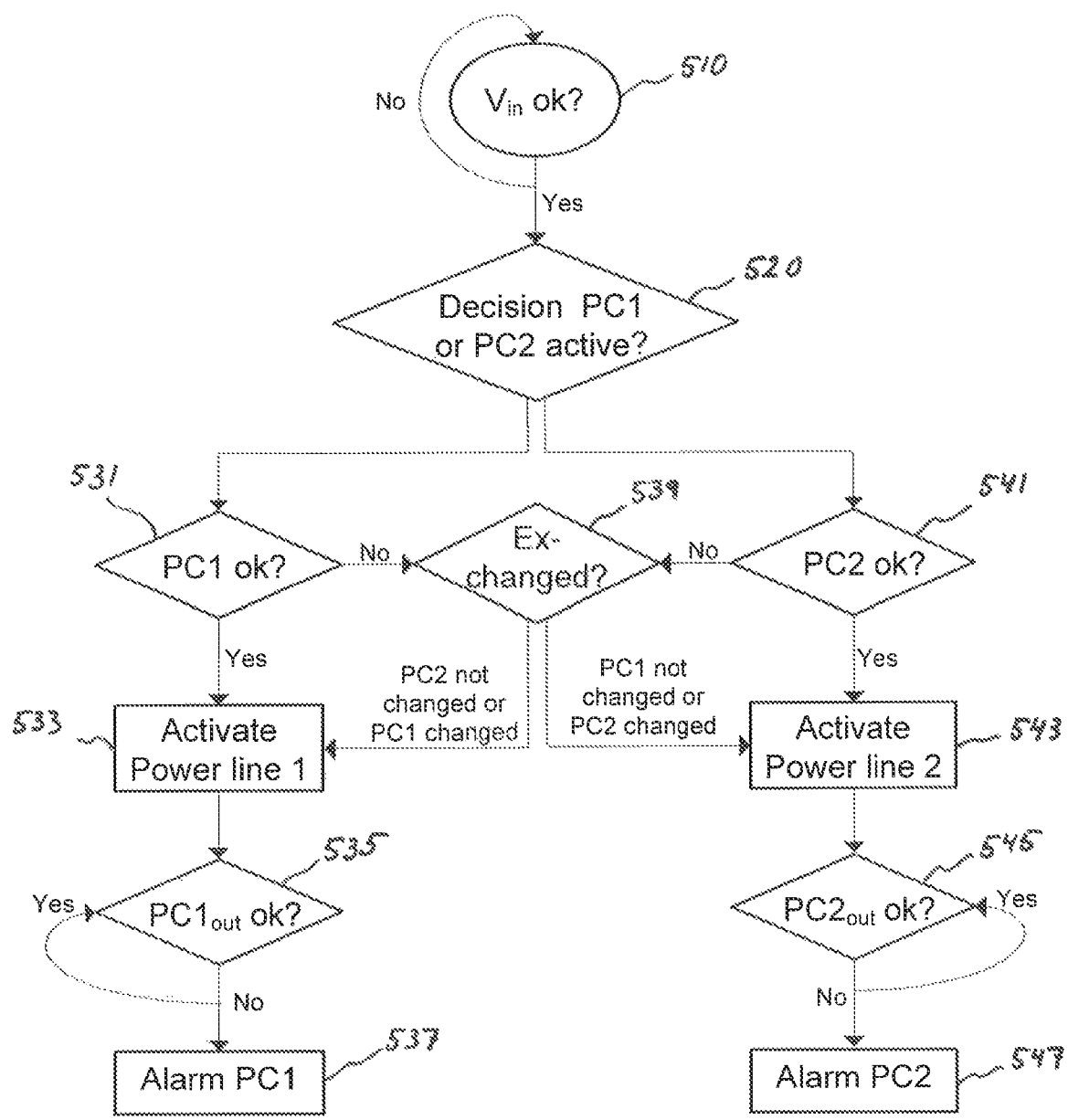
FIG. 5 shows a flow chart of a power converter control method for controlling two converters.

FIG. 5 shows a flow chart of a power converter control method for controlling two converters. The method controls which converter to engage in the power converter system described above, and in FIG. 3. The method may comprise the following steps.

Deciding 510 if input voltage is applied

Deciding 520 which power converter that are in turn to be activated/engaged

Checking 531 if a first converter unit PC1 was OK last time, and if not checking if it is replaced 539, i.e., exchanged for a functioning substitute;

Checking 541 further converters accordingly;

Engaging 533, 543 an OK converter by setting the relay units properly;

Checking 535, 545, continuously the output signal; If a converter unit is fed with input voltage but there is no corresponding output voltage, there is set a flag "PCx not OK", and that converter will not pass the test for OK in step(s) 531, 541;

Issuing 537, 547 an alarm if one of the converters are failing.

The invention claimed is:

1. A power converter system suitable to provide a load with electrical power, the power converter system comprising:
   an input voltage terminal ($V_{in}$), connected to an input relay unit configured to selectively connect, at least, one of a first power converter unit and a second redundant power converter unit to the input voltage terminal;
   an output voltage terminal ($V_{out}$);
   the first power converter unit (101) configured to supply the load with a total amount of electrical power;
   the second redundant power converter unit (102) configured to supply the load with the total amount of electrical power;
   the input relay unit (301);
   an output relay unit (302); and
   a control unit (315);
   wherein:
      the control unit (315) is configured to perform operations comprising:
         determining that the input voltage terminal received a first input voltage immediately after receiving a first no input voltage;
         in response to determining that the input voltage terminal received the first input voltage, operating the input relay such that the first power converter unit receives the first input voltage and the second redundant power converter unit does not receive the first input voltage;

determining that the input voltage terminal received a second no input voltage immediately after receiving the first input voltage, without receiving an intermediate voltage in between;

determining that the input voltage terminal received a second input voltage immediately after receiving the second no input voltage, without receiving an intermediate voltage in between;

in response to determining that the input voltage terminal received the second input voltage, operating the input relay such that the second redundant power converter unit receives the second input voltage and the first power converter unit does not receive the second input voltage:, the power converter system further comprises a number of sensors (311, 312, 321, 322) connected to the control unit (315) and configured for measuring the input and output voltages relating to each power converter unit; and the control unit (315) is configured to engage and disengage at least one of the first power converter unit (101) or the second redundant power converter unit (102) based on the readings of the sensors (311, 312, 321, 322).

2. The power converter system according to claim 1, wherein the control unit (315) is configured to engage one power converter unit and disengage a remaining power converter unit at power up based on the output of a random number generator that generates a new number at each subsequent power up.

3. A method for controlling a power converter unit to engage in a power converter system, the method comprising the following steps:

providing a power converter system, the system comprising:

an input voltage terminal ($V_{in}$), connected to an input relay unit configured to selectively connect, at least, one of a first power converter unit and a second redundant power converter unit to the input voltage terminal;

an output voltage terminal ($V_{out}$);

the first power converter unit configured to supply the load with a total amount of electrical power;

the second redundant power converter unit configured to supply the load with the total amount of electrical power;

the input relay unit;

an output relay unit;

a control unit configured to perform operations comprising:

determining that the input voltage terminal received a first input voltage immediately after receiving a first no input voltage;

in response to determining that the input voltage terminal received the first input voltage, operating the input relay such that the first power converter unit receives the first input voltage and the second redundant power converter unit does not receive the first input voltage;

determining that the input voltage terminal received a second no input voltage immediately after receiving the first input voltage, without receiving an intermediate voltage in between;

determining that the input voltage terminal received a second input voltage immediately after receiving the second no input voltage, without receiving an intermediate voltage in between;

in response to determining that the input voltage terminal received the second input voltage, operating the input relay such that the second redundant power converter unit receives the second input voltage and the first power converter unit does not receive the second input voltage;

determining (510) if input voltage is applied;

determining (520) which power converter that are in turn to be engaged;

checking (531) if the first power converter unit was OK last time, and if not checking (539) if it is replaced;

checking (541) further power converters such as the second redundant power converter unit accordingly;

engaging (533, 543) an OK converter by setting the relay units properly;

checking (535, 545), continuously the output voltage of the engaged power converter;

determining (535, 545) if the engaged power converter has failed based on the output voltage of the engaged power converter; and issuing (537, 547) an alarm if one of the power converters are failing.

* * * * *